United States Patent

[11] 3,633,073

[72] Inventors Arthur Reginald Day, III
  Camp Hill;
  Frank A. Kimpel, York, both of Pa.
[21] Appl. No. 882,792
[22] Filed Dec. 5, 1969
[45] Patented Jan. 4, 1972
[73] Assignee Borg-Warner Corporation
  Chicago, Ill.

[54] OVERLOAD AND OVERCURRENT REGULATION AND PROTECTION SYSTEM
  14 Claims, 3 Drawing Figs.
[52] U.S. Cl. .................................................. 317/38,
  62/217, 62/230, 317/20, 317/22, 317/36 TD
[51] Int. Cl. ...................................................... H02h 3/08,
  F25b 1/00
[50] Field of Search .......................................... 62/217,
  230; 317/13, 20, 36 TD, 22, 38, 41, 33; 340/253
  A; 318/332, 476, 477

[56] References Cited
  UNITED STATES PATENTS
  3,419,757  12/1968  Steen ............................  317/36 TD
  2,955,436  11/1960  Miner ...........................  62/217 X
  3,003,331  10/1961  Coburn .........................  62/217 X
  3,204,423   9/1965  Resh .............................  62/217 X
  3,317,795   5/1967  Steen ............................  317/33 X Primary Examiner—J. D. Miller
Assistant Examiner—Harvey Fendelman
Attorneys—Donald W. Banner, William S. McCurry and John W. Butcher ABSTRACT: An overload and overcurrent regulation and protection system and circuit are disclosed for a polyphase electric motor in a refrigeration system of the type including adjustable mechanical load decreasing means, such as adjustable prerotation vanes on a refrigeration centrifugal compressor. The system and circuit provides for varying types of overload conditions: continuous low overload, short term high overload, or for intermediate overload situations; before automatically operating a safety deenergizing relay switch. A time delay provides time for corrective measures to be instituted by the mechanical load decreasing means and allows transient overloads occasioned by normal conditions, such as starting or shifts in mechanical load, to be accommodated without unnecessarily disabling the motor. The circuit includes a rectifying circuit for deriving a DC signal proportioned to the maximum AC current in any one of the phases windings two pairs of Schmitt Trigger circuits employing solid state Operational Amplifier devices operated from a voltage dividing circuit and sources of different valued DC standard signals, for respectively producing an overload signal of one of four types, representing respectively small and large overloads, a single unijunction transistor timing circuit operated by one pair of the Schmitt Triggers, an SCR-controlled relay for operating a motor deenergizing device such as a relay in response to the timing circuit. The other pair of Schmitt Triggers function to control the mechanical load decreasing means to allow for correction of small overloads without unnecessarily deenergizing the compressor motor.

Inventors
Arthur R. Day III
Francis A. Kimpel
By Richard G. Kinney
Attorney 3,633,073

OVERLOAD AND OVERCURRENT REGULATION AND PROTECTION SYSTEM

FIELD OF THE INVENTION

The present invention relates generally to refrigeration systems and is concerned with an overload protection system and solid state circuit for an electric compressor motor of a refrigeration system. Even more particularly, the present invention is directed toward such a protection system and circuit which is of special utility with a polyphase alternating current electric motor for driving a centrifugal refrigeration compressor of the type that includes adjustable prerotation vanes or other means for adjusting the mechanical load placed upon the driving electric motor.

BACKGROUND OF THE INVENTION

In large capacity refrigeration equipment such as the type used for air-conditioning large buildings it is desirable to employ a large capacity electric motor as the prime mover for the refrigeration equipment. In many environments a polyphase electric motor is preferable. Normally a three-phase motor is used although two-phase motors are not unknown. Protecting such a motor in refrigeration systems from the overload conditions that may occur in such systems is the primary object of the present invention.

In such motors it may occur that the current load drawn from the polyphase power supply is greater in one phase than in the others. In this situation, one phase winding could be drawing an excessive and dangerous current while the average current would be within normal safety limits. It is an object of this invention to provide an overload protection system that protects against this situation.

It often occurs that overcurrents on such motors are temporary or transient conditions resulting from diverse causes such as sudden shifts in loading, normal start-up conditions, and temporarily imbalanced in the powerline. It is an object of the present invention to allow for these temporary and transient conditions without disabling the motor. Furthermore, the present invention provides means for temporarily preventing increases of and for decreasing the mechanical load that the compressor places on the motor in response to sensed overloads.

SUMMARY OF THE INVENTION

In achieving one or more of the above-stated objects a new and improved solid state motor protection system constructed in accordance with the present invention includes means for generating a signal representative of the current drawn by the motor, such as coils transformer coupled to the motor winding for feeding rectifiers which drive a peak detector and thereby produce a DC voltage signal whose level is representative of the maximum current drawn by any one phase winding of the motor. Coupled to this representative signal are a plurality of overload signal producing circuits, such as Schmitt Trigger comparators, with different level reference voltage inputs, for producing overload signals representative of different degrees of overcurrent. In accordance with one main feature of the invention a single timer such as an R-C and unijunction transistor circuit, is provided for operation by one or more of the overload signal circuits to produce a deenergizing signal, after a variable time delay, which signal is used to disconnect electric power to the motor.

In accordance with another main feature of the invention small overloads, as evidenced by overload signals from overload signal producing circuits, are employed to prevent further mechanical loading or to reduce mechanical loading of the compressor, such as by overriding the conventional current regulator for control of the prerotational vanes on a compressor of the centrifugal type. This feature has the advantage of employing equipment normally used in other functions (i.e., temperature control) to aid in protection of the motor.

Preferably both of these main features of the invention are employed together to achieve a range of reactions to varying overloads that greatly reduce the occasions for deenergizing the motor for overloads and yet provides sure and positive deenergization when necessary.

In particular, one new and improved solid state motor protection system constructed in accordance with the present invention comprises means for generating a signal representative of the maximum instantaneous current drawn by any winding of the motor, a source of a first, second, third and fourth reference signals and first, second, third and fourth Schmitt Trigger comparators for comparing the load representative signal with, respectively, the first, second, third and fourth reference signals, and for producing load reducing overload signals when the load representative signal reaches a certain relationship with the first and second reference signals and motor stopping overload signals when the load representative signal reaches a certain relationship with the third and fourth reference signals, a load reducing means such as prerotation vanes operated as a function of the load reducing overload signals which acts to decrease the motor current and timing means operated as a function of the motor stopping overload signals which function to interrupt the current to the motor after a delay which is dependent upon the frequency and the persistence of the motor stopping overload signals.

BRIEF DESCRIPTION OF THE DRAWINGS

The features of the present invention which are believed to be novel are set forth with particularity in the appended claims. The invention, together with the objects and advantages thereof, may best be understood by reference to the following description taken in connection with the accompanying drawings, in the several figures of which like reference numerals identify like elements, and in which:

DETAILED DESCRIPTION

Figure 1:
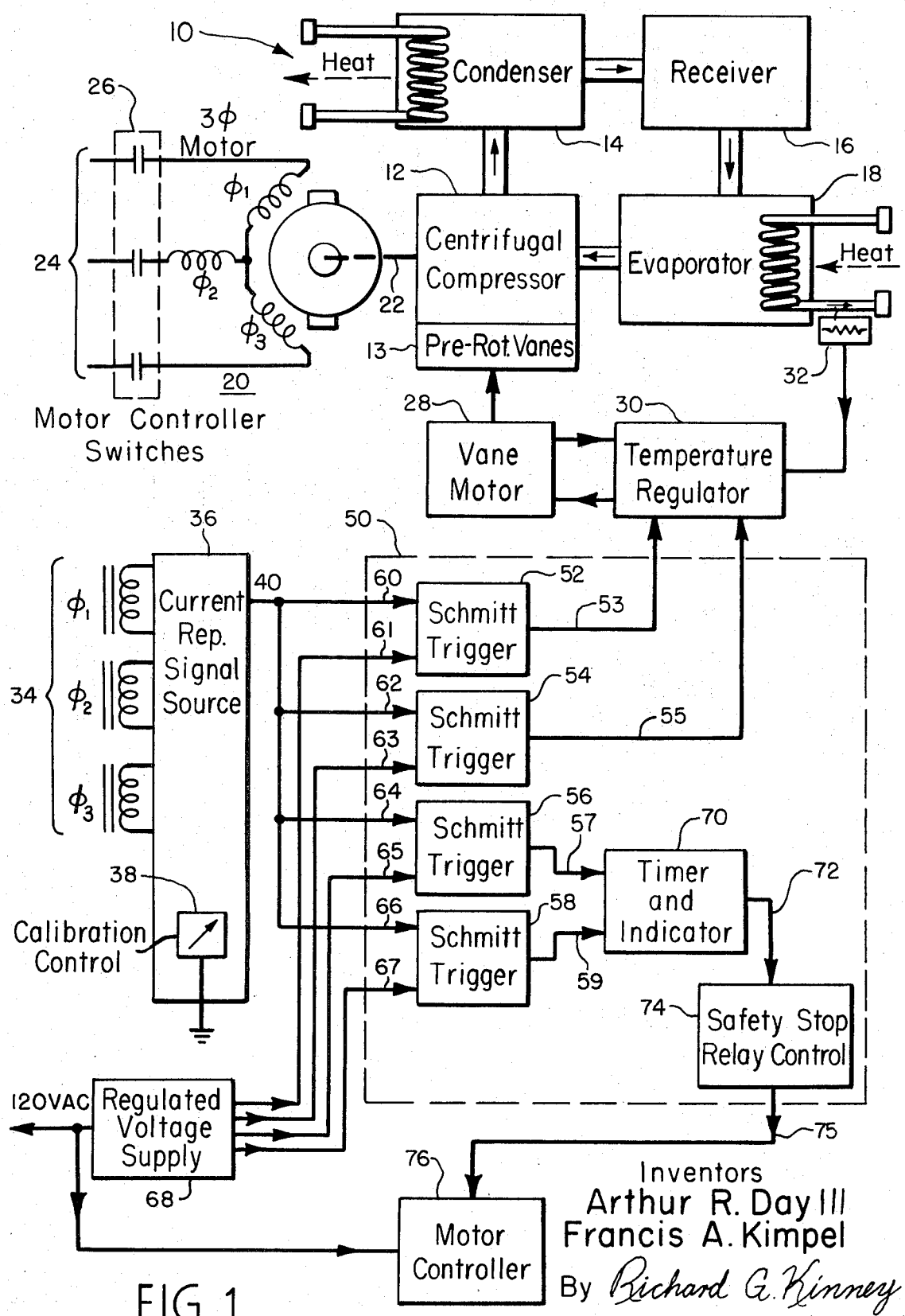
FIG. 1 is a block diagram of a solid state motor overload protective system constructed in accordance with the principles of the present invention as employed with a refrigeration system.

Referring to FIG. 1 there is depicted a refrigeration system including its control and a motor overload protection system constructed in accordance with the present invention. The overall refrigeration system is generally designated by the numeral 10. The refrigeration system 10 is of the large capacity type such as might be employed in air conditioning a large building and employs the vapor-compression refrigeration cycle.

In such vapor-compression cycle equipment it is conventional to employ a closed loop processing of a refrigerant such as freon. The refrigerant is continuously processed in a closed loop operation wherein it is compressed, liquefied to give up heat at one stage, collected, then evaporated to take on heat at another stage, and finally recompressed again.

In achieving this cycle the system 10 employs a centrifugal compressor 12 which compresses the refrigerant and from which the compressed refrigerant is fed to a condenser unit 14. The condenser 14 often includes a water conductive heat exchanger to facilitate the removal of heat therefrom. From the condenser 14 the now-liquid refrigerant is received and collected in a receiver unit 16 and controllably delivered therefrom to an evaporator unit 18. In the evaporator 18 the refrigerant is again changed to a gaseous state thereby absorbing heat. A second heat exchanger employing water as a medium is often provided in the evaporator 18. From the evaporator 18 the gaseous refrigerant is continuously returned for recycling to the compressor 12. The primary motive power for the system 10 is supplied by a three-phase electric motor 20 which is mechanically coupled to the compressor 12 as signified by the dashed line 22.

The motor 20 is of a large capacity type and is fed from three-phase powerlines 24 which are connected to the coils of the motor 20 through various conventional switching which includes a set of controlled in common switch contacts 26 of a controller 76, one for each line of 24, for interrupting current. Normally the motor 20 draws current and power from the lines 24 in proportion to the mechanical load placed upon it by the compressor 12. The effective load of the compressor 12 is variable by means such as internal prerotational vanes 13. Reference is made to U.S. Pat. Nos. 3,081,604 and 3,380,262 for compressors employing different types of such prerotational vanes. Basically, however, such vanes serve to modify the mechanical opening and alter the nature of the flow of refrigerant to the compressor 12 and to thereby change the mechanical loading that the compressor places upon the motor 20.

This load-varying means 13 is conventionally operated by a vane control motor 28. The motor 28, which is of a much smaller size than that of the prime mover motor 20 is, in turn, controlled and powered by a temperature regulator 30. During normal operation, the compressor 12 load is controlled by the temperature regulator 30 to maintain the desired cooled liquid temperature leaving the evaporator 18 heat exchanger. The cooled liquid temperature is sensed by a temperature sensor 32 which provides a temperature representative control signal to the temperature regulator 30.

As thus far described, the system during normal operation functions to regulate the operation of the refrigeration equipment to achieve a desired temperature output. In normal operation the electrical power taken from the powerlines 24 by the motor 20 would be proportioned to the mechanical load placed on the motor by the compressor 12. The system is designed for operation at a nominal full load figure, which, as the power consumed by the motor is proportional to the current drawn thereby, is here expressed in terms of a percentage of "full load amperage" or "FLA."

So far the description has been concerned with the normal running operational state of the system 10. However, there exists the quite real possibilities of abnormal situations occurring which, if not protected against, could have ruinous results. One such condition might be characterized as the "locked rotor" condition. In this state the rotor is not moving and no counter electromotive forces are generated in the primary motor winding. As such, the effective impedance exhibited thereby is quite small and consequently an excessive current would flow through the coils. If not checked this current would soon cause the motor coils to overheat, and their insulation to breakdown to thereby short circuit the coils and consequently destroy the motor 20.

To prevent this and similar evils it is conventional to provide some overload or overcurrent protection. The present invention is primarily concerned with such a system and this improved overcurrent protection system will now be described.

To derive a signal proportional to or representative of the current into the motor 20 three coils 34 are provided, each one being in transformer relationship with a different phase line of the motor 20. Within each coil 34 is developed a current signal proportional to the current drawn by the corresponding phase line. These three current signals, each proportionate to the current in one phase line of the motor 20 are coupled to a rectifier and combiner unit 36 wherein a combined voltage signal representative of all three phases is derived on line 40. The level of this signal and the sensitivity of the hereinafter described circuitry is controlled and adjusted by a calibration unit 38.

In accordance with one feature of the present invention the output from the unit 36 is proportional to the greatest current present in any of the phases of the motor rather than being proportional to only one or to the average of the currents. This provides greater degree of protection as it protects against the unbalanced load situation wherein one phase coil in the motor 20 might draw excessive current and burn out or be damaged while the other coils are operating normally. This composite current representative signal is fed via the line 40 to a current regulator and safety relay operating circuit 50.

The current regulator and safety relay operating circuit 50 comprises a first, a second, a third and a fourth comparator and overload signal generators designated 52, 54, 56 and 58. These comparators 52, 54, 56 and 58 are of the Schmitt Trigger type and function to produce an overload representative signal on their respective outputs 53, 55, 57 and 59 whenever the current representative signals at one input line, respectively 60, 62, 64 and 66, exceed a certain relationship with reference signals on another input respective 61, 63, 65 and 67. The reference signals are supplied to the comparator-overload signal generators 52, 54, 56 and 58 from a reference signal generator 68 of the regulated voltage supply type. The supply 68 also serves to supply DC power to the control circuitry.

The outputs 53 and 55 of respectively the comparators 52 and 54 are fed to different inputs of the temperature regulator 30. The comparators 52 and 54 produce overload representative output signals at different current levels slightly above the rated motor "FLA." The function of comparators 52 and 54 is to act as a two-stage motor current regulator by overriding the temperature regulator 30 when an overload situation occurs to prevent increased loading of the motor 20, if motor current is greater than the operating point of comparator 52, and to cause the prerotation vanes 13 to be operated by the vane control motor 28 in such a manner as to reduce the motor 20 loading and, hence, the motor 20 current, if that current has risen above the operating point of comparator 54. An advantage and feature of this system is that the relative positions of the four comparators are determined by fixed reference signals providing sequential action of the current limiting function and the current stopping function. Both functions are calibrated by a single calibration control, the control 38.

The outputs 57 and 59 of respectively the comparators 56 and 58 are fed to different inputs of a single timer and indicator circuit 70. It is another advantage and feature of the present invention that of these two overload signals, one is for high overcurrent and the other is for low overcurrent and that both are fed to a single timing circuit 70 which is responsive to one or both to produce a deenergizing signal which is coupled as indicated by line 72, to a safety stop relay control circuit 74. The safety stop relay control 74 functions to deenergize the controller 76 and open the switches 26 in response to a signal on line 72 from the timing circuit 70.

Figure 2:
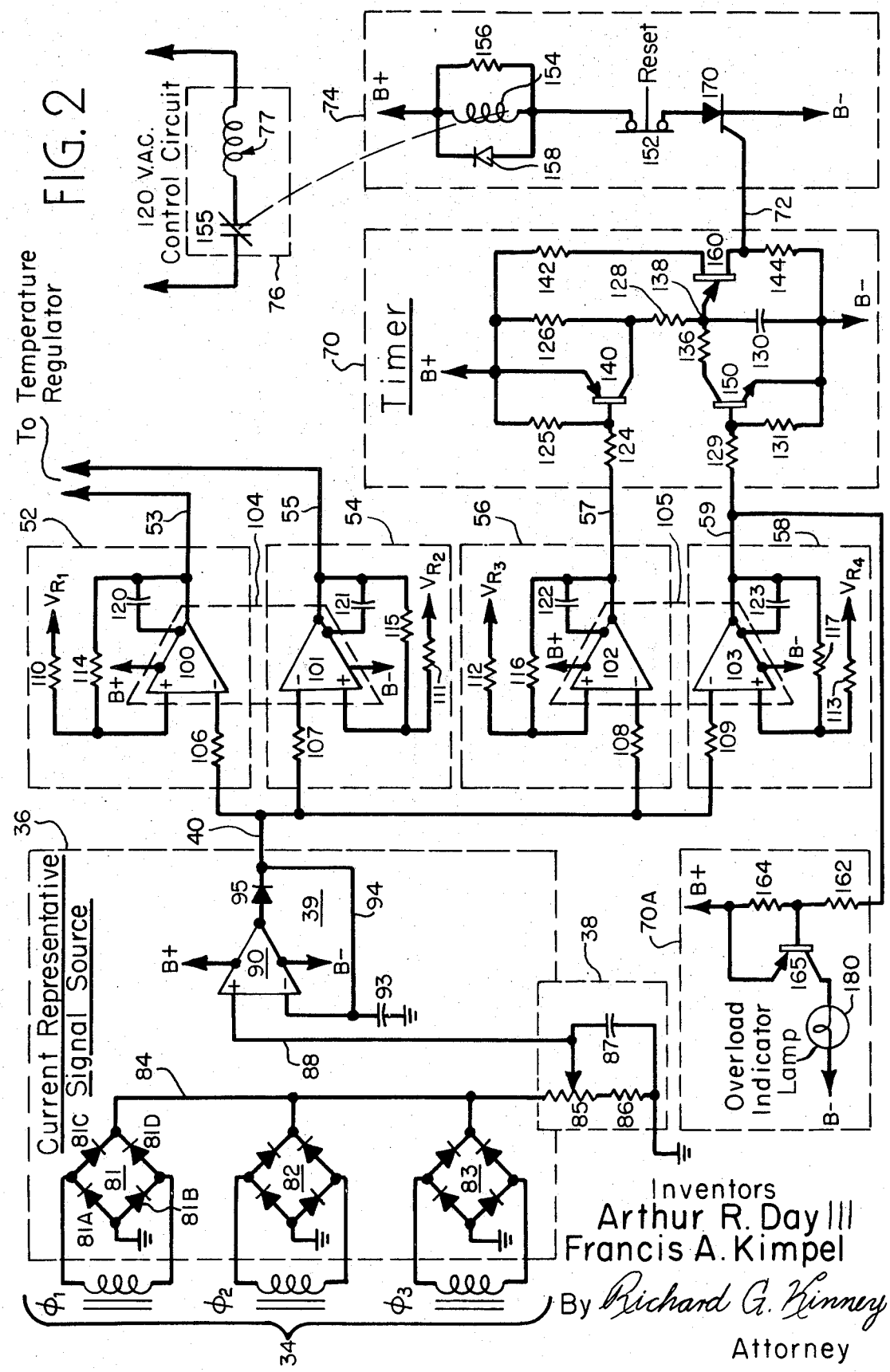
FIG. 2 is a circuit diagram of a portion of the solid state motor overload protection system of FIG. 1.

The novel overcurrent detector, current regulator, and current interrupter circuits of the present invention are depicted in greater detail in FIG. 2. Referring to that figure this portion of the system 10 will now be considered in more detail.

The rectifier and load representative signal generating unit 36 includes three full wave bridge rectifier circuits 81, 82 and 83 whose DC outputs are connected in common to line 84. Taking the rectifier circuit 81 as illustrative of all three circuits, it includes four solid state diodes 81A, 81B, 81C and 81D which are connected sequentially to one another in a square array.

Two of the diodes 81A and 81B have their anodes connected in common and to a plane of reference potential which shall be here taken as ground. It should be noted that electrical "ground" as herein used need not be earth potential. Similarly the terms cathode and anode as used herein are used in the now conventional sense for semiconductor diodes, such as 81A, and represent respectively those terminals from which and to which conventional electric current would flow with the least impedance rather than a thermionic "anode" or "cathode."

Across the cathodes of the diodes 81A and 81B is connected the first phase coil $\phi_1$ of the coils 34. The other two diodes 81C and 81D have their cathodes connected in common and to the line 84 while their anodes are respectively connected to the junction between the diode 81A and the coil $\phi_1$ and the junction between the diode 81B and that coil.

The calibration control 38 comprises a variable-tap resistor 85 having one end connected to the conductor 84, its other end connected through a fixed resistor 86 to ground and its tap connected to an electrical conduction line 88. A high-frequency transient shunt capacitor 87 is also connected between ground and the junction of line 88 and the tap of resistor 85.

The line 88 connects the composite signal from the three full wave rectifiers (as adjusted in amplitude by the circuit 38) to a peak detector circuit 39 including as its prime component an Operational Amplifier 90. The line 88 is connected to the positive primary input of the Operational Amplifier 90. Operational Amplifiers are active integrated circuit components that have been commercially available in the United States for several years. Reference could be had to "Logic Handbook," (1969) by Digital Equipment Corporation pages 223–225 and 232–237, and references there cited for a description of the devices. The Operational Amplifier 90 has a bias voltage input terminal connected to a regulated source of positive DC voltage B+ and another bias voltage input terminal connected to a regulated source of negative DC voltage B−. The negative input terminal of the Operational Amplifier 90 is connected through a charge holding capacitor 93 to ground and also to a feedback line 94. The capacitor 93 also provides frequency stabilization for the Operational Amplifier 90. The output terminal of the Operational Amplifier 90 is connected to the anode of a solid state diode 95 whose cathode is connected to both the feedback line 94 and to the load representative signal line 40. As so connected the Operational Amplifier 90 with the associated circuitry functions to detect and hold the peak reoccurring voltage present in the line 88 at its output 40.

The output on line 40 is fed to the inputs of the four Schmitt Triggers 52, 54, 56 and 58. The Schmitt Triggers 52, 54, 56 and 58 are formed from four Operational Amplifiers, respectively designated 100, 101, 102 and 103, which are preferably of the type that are formed in a unitary manner with two amplifiers on a single substrate chip. As indicated in FIG. 2, Operational Amplifiers 100 aNd 101 are formed on a single substrate chip 104 and Amplifiers 102 and 103 are formed on another similar chip 105. Such dual Operational Amplifier units are presently available and one acceptable unit is the commercially available MC–1437L type manufactured by Motorola Semiconductor Products, Inc.

Except for the provision of common positive and negative bias voltage inputs, which are here appropriately connected to sources of regulated positive and negative DC voltage, the Operational Amplifiers 100, 101, 102 and 103 function and are connected independently. The electrical characteristics of such devices which are formed on a common substrate chip are well matched and respond very similarly to changes in bias voltage and temperature. Hence, another advantage and feature of this invention is the ability to accurately detect current representative signal levels which are very close in value (typically 1–3 percent separation) over a wide temperature range without individually calibrating each comparator 52, 54, 56 and 58. Use of the matched Amplifier chips 104 and 105 also insures that all comparators 52, 54, 56 and 58 will operate in the desired sequence over a wide variety of environmental conditions.

The load representative signal on line 40 is fed to the negative primary input of Operational Amplifiers 100, 101, 102 and 103 through resistors designated respectively 106, 107, 108 and 109. The positive primary inputs of the Operational Amplifiers 100, 101, 102 and 103 are respectively connected to different valued reference signal voltages designated $V_{R1}$, $V_{R2}$, $V_{R3}$, and $V_{R4}$ in the voltage supply 68 through respectively resistors 110, 111, 112 and 113. The positive inputs are also connected to their respective Operational Amplifier's outputs through a feedback resistor, respectively 114, 115, 116 and 117. For frequency stability, the output of each Operational Amplifier 100, 101, 102 and 103 is coupled back to another one of its own terminals via a coupling capacitor designated respectively 120, 121, 122 and 123.

As previously mentioned, the outputs of the Schmitt Triggers 52 and 54 are coupled respectively over line 53 and 55 to the temperature regulator 30. The outputs of comparators 56 and 58 are coupled respectively over lines 57 and 59 to the timing circuit 70. This circuit 70 includes a PNP-transistor 140 whose base is connected through a resistor 124 to the line 57. The base of the transistor 140 is also connected to a source of positive DC potential B+ through a bias resistor 125.

The emitter of the transistor 140 is connected direct to B+ and its collector is also connected, through a bias resistor 126, to this source. The collector of this transistor 140 is further connected through another resistor 128 to a junction point 138 and one side of a capacitor 130. The other side of capacitor 130 is connected to a source of negative DC voltage B−.

The line 59 is similarly connected through a resistor 129 to the base of a NPN-transistor 150 which base is also connected through a bias resistor 131 to the source of negative voltage B−.

The emitter of the transistor 150 is connected directly to the negative bias source B− while its collector is connected through a resistor 136 to the junction 138 of the capacitor 130 and the resistor 128.

This junction point 138 is further connected to the emitter or control electrode of a unijunction transistor 160. The unijunction transistor 160 has one of its two bases (Base 2) connected through a current limiting and temperature compensating resistor 142 to the source of positive voltage B+. The other of its bases (Base 1) is connected through a resistor 144 to the negative bias B− and also via the line 72 to the gate or control electrode of a silicon controlled rectifier (SCR) 170 which forms part of the safety stop relay control circuit 74.

The cathode of the SCR 170 is connected directly to a source of negative DC voltage B−, while the anode of the SCR 170 is connected to one terminal of a normally closed pushbutton reset switch 152. The other terminal of switch 152 is connected to one side of the parallel circuit connection of a safety relay operating coil 154, a resistor 156 and a solid state diode 158. The other side of this parallel circuit connection is connected to a source of positive DC voltage B+. The cathode of the diode 158 is connected to this voltage source so as to be back-biased during the time that the SCR 170 is conducting and the switch 152 is closed.

The motor controller 76 circuitry consists of a normally closed switch contact 155 of the safety relay 154 connected in series with the motor starter relay operating coil 77. This series connected circuit is connected across a 120 VAC powerline. The three switch contacts 26 of the motor starter relay 77 are located in the incoming three-phase supply leads 24 as mentioned previously.

Also included as part of the timer circuit 70 is an indicator portion 70A which employs a light emitter, electric lamp 180 as a means for indicating an overload condition. A resistor 162 of the overload indicator circuit 70A is connected to line 59. The other end of this resistor 162 is connected to the base of a PNP-transistor 165 and also to a source of positive DC voltage B+ through a bias establishing resistor 164. The emitter of the transistor 165 is also connected to B+ and its collector is connected to one side of the lamp 180. The other side of the lamp 180 is connected to a voltage plane below that of B+ such as a source of negative DC electric potential B−.

DETAILED OPERATION

As mentioned before, the above-described circuit functions in an overall manner to regulate the motor 20 current and to interrupt the circuit connection from the powerlines 24 to the electric motor 20 in response to a sensed overcurrent of a sufficient magnitude and duration, after a period whose length depends upon the severity and/or frequency of reoccurrence of the overcurrent during which a mechanical load decreasing means acts to reduce the motor 20 current to a safe level.

The currents induced in the secondary coils 34 are rectified in the full wave rectifiers 81, 82 and 83 and combined on line 84. This composite voltage signal is fed via the tap on resistor 85 and line 88 to the peak detector circuit 39 including the Operational Amplifier 90. The output of this circuit is present on line 40 and constitutes a voltage equal to the peak voltage presented on line 88 and is representative of the maximum current drawn by any phase winding of the motor 20 of FIG. 1. The precise relationship between the currents drawn by the three phases of the motor 20 and the signal on line 40 will be considered in more detail below.

The load representative signal of line 40 is fed to the two-stage current regulator circuit comprised of Schmitt Triggers 52 and 54. These circuits provide override signals via respective lines 53 and 55 for the temperature regulator 30. The temperature regulator 30 controls the temperature of the chilled water leaving the evaporator 18 heat exchanger in response to signals from the sensor unit 32 by energizing the vane motor 28 and causing the prerotation vanes 13 to operate and adjust the cooling capacity of the system 10. The trigger point of the Schmitt Trigger 52 is determined by $V_{R1}$ and is set at a level above that of the signal on line 40 for all voltage levels below a first small overload, preferably about 102 percent of the rated motor 20 full load current. Trigger 52 produces a DC positive voltage on line 53 of approximately B+ in value when the signal on line 40 is below the trigger point and for values above this produces a negative output voltage of approximately B− in value. The change of polarity of the output signal on line 53 during an overload is sensed by the temperature regulator 30 circuitry and used to inhibit its operation. This prevents any further increase in loading of the compressor motor 20 due to operation of the prerotation vanes 13.

At a slightly higher overload signal, typically 105 percent FLA, the second stage of the current regulator trigger 54 operates. The output of the Trigger 54 is on line 55 and changes from a voltage level of approximately B+ in value to the B− voltage level when the load representative signal on line 40 exceeds the reference voltage $V_{R2}$. The change in polarity of the output voltage signal is detected by the temperature regulator 30 which now acts to decrease the motor 20 current by operating the prerotation vanes 13 in such a manner as to reduce the compressor 12 capacity and, hence, the motor 20 current.

When the load representative signal decreases to about 103 percent FLA the Schmitt Trigger 54 reverses itself and its output level switches to the B+ voltage level. This change is sensed by the temperature regulator 30 which acts to stop the prerotation vanes 13 from reducing the motor 20 current. As the motor 20 current reduces to a level below the operate point of the Schmitt Trigger 52, preferably about 100 percent FLA, the Trigger 52 changes state and its output signal on line 53 rises to the positive supply voltage level. The reverse in voltage polarity on line 53 removes the inhibiting signal from the temperature controller 30 and permits it to function normally.

The Triggers 56 and 58 are the load representative signal comparators for the overload portion of the motor protection system. The Triggers 56 and 58 operate in a manner similar to Triggers 52 and 54 except that the reference voltages respective $V_{R3}$ and $V_{R4}$ are higher in value and thus the output pulses on respective lines 57 and 59 occur only when larger overcurrent signals are present on line 40. The Schmitt Trigger 58 is calibrated to operate preferably at a signal level of 108 percent FLA, while the trigger 56 is typically operated by a load representative signal of 300 percent FLA.

With both of the Triggers 56 and 58 in the normal, no overload, condition the transistor 140 of the timer circuit 70 is biased into its nonconductive or "off" state by the positive voltage on line 57 while the transistor 150 thereof is biased into its conductive or "on" state by the positive voltage on line 59. In this circuit condition, current flows from B+ to B− through the resistor 126, the resistor 128, the circuit point 138, the resistor 136 and the collector-emitter circuit of the transistor 150. The circuit point 138 is kept thereby at a voltage level below that required to operate the unijunction transistor 160 and the SCR 170 of the safety relay control circuit 74 is nonconducting. Consequently, no current flows through the coil 154 and the relay switch 155 remains closed.

When a small overload exists (over 108 percent FLA but under 300 percent FLA) the signal on line 40 rises to a level to operate the Schmitt Trigger 58 but not the Schmitt Trigger 56. In this state, the reversed polarity of the voltage on line 59 turns off the transistor 150 and interrupts the current path through the collector-emitter circuit. As soon as this occurs the voltage across the capacitor 130 begins to rise and, if the signal on line 59 remains negative, it will, after a certain time delay reach the firing voltage of the unijunction transistor 160. When this occurs the SCR 170 will be turned "on" or rendered conductive and the motor controller 77 controlled by the switch 155 of the safety relay coil 154 will operate to stop current flow to the motor 20. The time delay for the firing of the unijunction transistor 160 is determined by the values of the resistors 126 and 128 and the value of the capacitor 130 and these are preferably chosen to provide a relatively long delay of, for example, 60 seconds, in the above-described situation.

It should be noted that it is the nature of Silicon Controlled Rectifiers (SCR) that, once "fired" or rendered conductive its gate or control electrode loses control and the SCR will remain conducting until the current through it is interrupted. In the case of the SCR 170, this is done by the switch 152. When this interruption occurs, SCR 170 is again rendered nonconductive until its gate signal again exceeds a fixed threshold value.

The reversal of the voltage on line 59 also renders the transistor 165 at the indicator 70A conductive and, without a time delay, lights the lamp 180 to give a visual indication of an overload condition.

When after a long, normal no overload period a large overload condition (over 300 percent FLA) is indicated by a higher voltage level on line 40, both of the Schmitt Triggers 56 and 58 are operated. This causes the voltages on both of the lines 57 and 59 to change polarity. The change of the voltage on line 59, as explained above, causes the lamp 180 to light and turns "off" the transistor 150. The change of the voltage on line 57 from positive to negative turns "on" or renders conductive the transistor 140 which bypasses the resistor 126 from the capacitor 130 charging the circuit. This effectively removes the resistance of the resistor 128 from the circuit and materially shortens the charging time of the capacitor 130 and thereby causes the unijunction transistor 160 to fire after a much shorter time delay. The relative values of the resistors 126 and 128 are preferably chosen to shorten the time delay to, for example, about 6 seconds.

Figure 3:
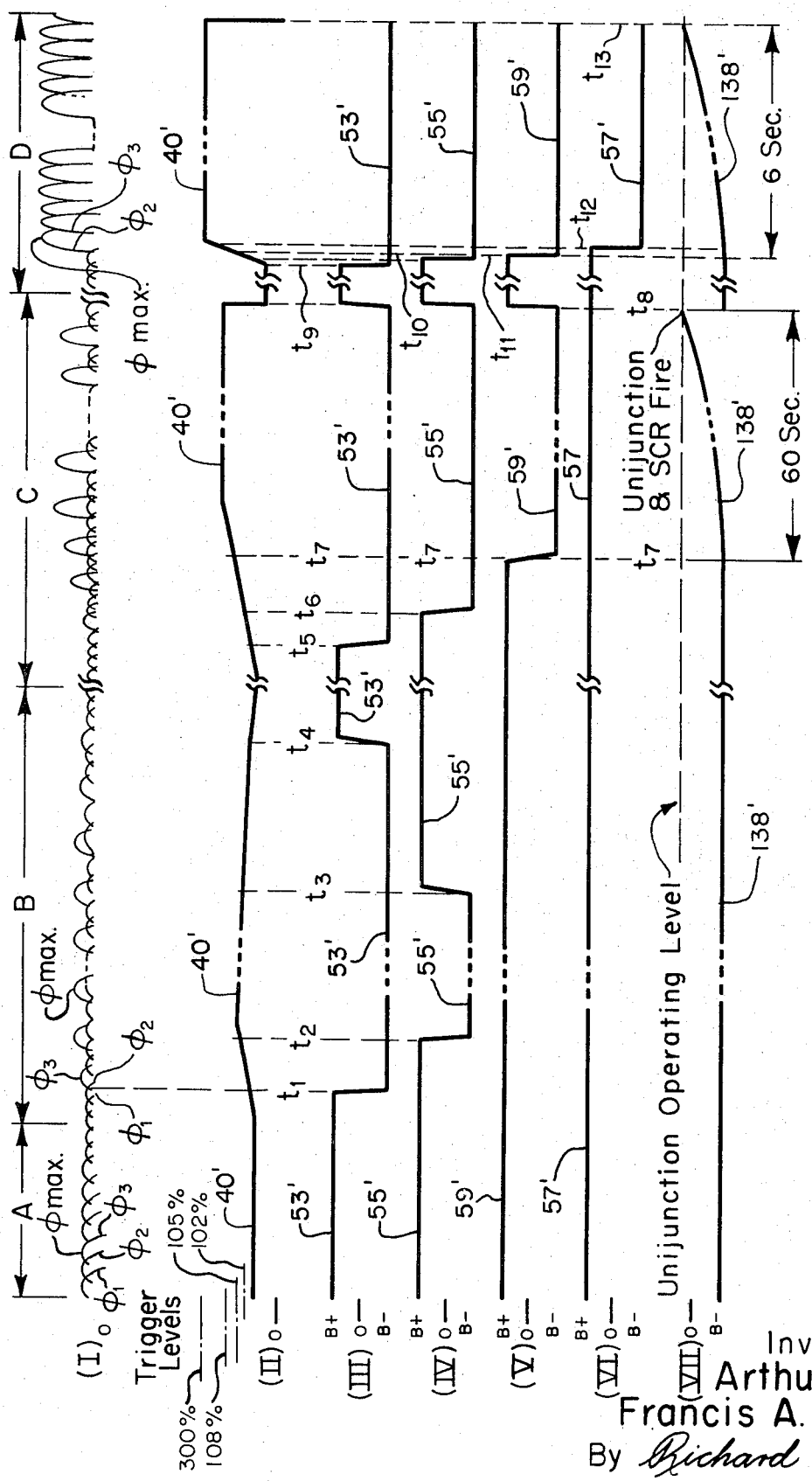
FIG. 3 is a graphical chart of voltage verses time curves of various portions of the circuit of FIG. 2 for illustrating its operation.

The detailed operation of the circuit can best be understood by reference to FIG. 3 together with FIG. 2. In FIG. 3 the electrical signals at various points of the circuit of FIGS. 1 and 2 are graphically presented under four conditions. In the first time period A, normal no overload operation is represented. In the second time period B, small overcurrent (over 105 percent FLA and below 108 percent FLA) in one phase of the electric motor is illustrated. In the third period C, the response of the circuit to a larger overload (over 108 percent FLA and below 300 percent FLA) is illustrated. In the fourth period D, the response of the circuit to a large overload (over 300 percent FLA) is shown.

Referring to FIG. 3, the first graph there represented is generally designated (I) and represents the rectified individual voltages developed on conductor 84 in response to load current being drawn by the motor 20. For convenience these three curves are represented together in Graph (I) by dashed lines and designated $\phi_1$, $\phi_2$ and $\phi_3$, respectively. Each of these voltages represent the contribution of each of the full wave rectifiers 81, 82 and 83 to the composite voltage present on line 84. This composite signal is also represented in Graph (I) by $\phi$max and constitutes the maximum instantaneous value of any one of the phases. This is so because whenever the voltage on line 84 rises above the instantaneous contribution of one of the rectifier bridges 81, 82 or 83 it back biases the diodes 81C, 81D; or 82C, 82D; or 83C, 83D thereof and prevents any additional contribution therefrom. This composite voltage is fed, at an adjusted level via the circuit 38 and line 88 to the peak detector circuit including the Operational Amplifier 90.

The output from the Operational Amplifier 90 which is fed on line 40 to the Schmitt Trigger comparators 52, 54, 56 and 58 (FIG. 1) is represented in FIG. 3 in Graph (II). During no overcurrent condition, period A, this is a direct current voltage represented by the line 40' proportional to $\phi$max and motor 20 current at less than 102 percent FLA.

The voltage output of the conductor 40 is fed to the Schmitt Triggers 52, 54, 56 and 58 whose respective outputs on line 53, 55, 57 and 59 respectively are represented by Graphs (III), (IV), (VI) and (V) in FIG. 3 designated 53', 55', 57' and 59'. During normal operation as represented in FIG. 3 by time period A, there is a positive voltage output from each of the Schmitt Triggers.

The voltage level at circuit point 138 is illustrated in FIG. 3, Graph (VII) by line 138'. As can be seen, this voltage is normally at approximately the B− voltage level.

A small overload (over 105 percent FLA and under 108 percent FLA) is depicted in time period B of FIG. 3 to illustrate the two-stage current regulating action of the system. The increase occurs at time $t_1$. In this case, the overload is shown in Graph (I) in $\phi_3$. The full wave rectified components show the increased wave $\phi_3$, and the wave$\phi$max, is of greater maximum magnitude. The increase in maximum voltage $\phi$max results in an increase in the voltage on line 40 as indicated by the rise in the line 40' Graph (II) at $t_1$. This results in the triggering of the Schmitt Trigger 52 at $t_1$ and a consequential shift in the output on the conductor 53, as indicated by the line 53' in Graph (III) of FIG. 3. The change of the voltage on line 53 is sensed by the temperature regulator 30 and used to inhibit it from increasing the motor 20 loading via operation of the prerotation vanes 13.

As the magnitude of the overcurrent signal 40 continues to rise as shown by line 40', it exceeds the trigger point of the Schmitt Trigger 54 and causes the voltage level on line 55 to change as indicated by line 55' in Graph (IV) at time $t_2$. This change in polarity is sensed by the temperature regulator 30 which now operates the prerotation vanes 13 in such a manner as to decrease the motor 20 loading and thus the motor 20 current. The resultant decrease in the load representative signal on line 40 is depicted in Graph (II) by line 40' and results in the reversal of the voltage on line 55 as shown by line 55' at time $t_3$. This change in voltage stops the current reducing action of the prerotation vanes 13. Should motor 20 current continue to decrease due to reduced loading at sometime such as $t_4$ in Graph (II) the load signal indicated by line 40' will be reduced to the rated motor 20 current. At that time the Schmitt Trigger 52 changes state and the voltage on conductor 53 reverses polarity. This removes the inhibiting signal from the temperature regulator 30 and allows it to function in the normal manner. It should be noted that in this case the load current remained less than 108 percent FLA and the timer 70 was not activated.

A larger overload (over 108 percent FLA and under 300 percent FLA) is illustrated by the waveforms of period C in FIG. 3. In this situation the overload condition begins at $t_5$ at respective times $t_5$, $t_6$ and $t_7$ as the load representative signal depicted by line 40' on Graph (II) increases. Operation of Triggers 52 and 54 inhibit the operation of the temperature controller 30 and cause vane closing as described above. In addition, the change of voltage on line 59 as shown on line 59' in Graph (V) at time $t_7$ turns "off" transistor 150 and starts the rise of voltage across the capacitor 130 as symbolized by line 138', Graph (VII). This rising voltage, after a time delay of approximately 60 seconds reaches the operating level for the unijunction transistor 160 thereby firing it and the SCR 170 thus operating the safety relay 154 at time $t_8$.

The third set of waveforms of period D, in FIG. 3 represent one of many possible large overload situations in which all three phases draw excessive current (over 300 percent FLA). This situation results in a large increase in the voltage $\phi$max, a corresponding variance in the voltage 40', followed first by a shift in the output of the Schmitt Trigger 52, line 53' at $t_9$, then a shift in the output of the Schmitt Trigger 54, line 55' at $t_{10}$, then a shift in the output of Trigger 58, line 59' at $t_{11}$, and finally a shift in the output of Trigger 56, line 57' at $t_{12}$. This first results in a slow building of voltage at junction 138 and then a more rapid buildup after $t_{12}$ resulting in the operation of the safety relay at time $t_{13}$. This occurs after a short delay of, e.g., only about 6 seconds.

The representation of FIG. 3 is not to scale and is but illustrative of the behavior of the circuit. It should be understood that with transients and time lags of the components that the actual curves might appear somewhat different, but would behave in an overall manner as there depicted.

It should be noted that the time delay prior to operation of the safety relay is a variable whose exact value depends upon not only the degree of overload but also the immediate past history of overloading as reflected by the charge on the capacitor 130. As a further illustration, assuming that a long period of normal operation a small overcurrent condition comes into existence and after 30 seconds a large overload condition occurs and continues. In this case the safety relay would operate 3 seconds after the start of the large overload rather than 6. Similarly, a short term large overload will materially shorten an afteroccurring small overload's delay period.

For completeness in the disclosure of the above-described system but not for purposes of limitation the following representative values and component identifications are submitted. These values and components were employed in a system that was constructed and tested and which provided high-quality performance. Those skilled in this art will recognize that many alternative elements and values may be employed in constructing systems and circuits in accordance with the present invention. Indeed, even though the herein set out system and circuit are the presently considered best mode of practicing the invention, the present inventors may themselves decide, after further experiments and experience or for differing environments of use, to make modifications and changes.

| Circuit Element | Type or Value |
| --- | --- |
| Operational Amplifier 90 | MC 1439 G (Motorola) |
| Operational Amplifiers 100, 101, 102, 103 | MC 1437 L (Motorola) |
| Unijunction Transistor 160 | 2N 4852 |
| Silicon-Controlled Rectifier 170 | 2N 5060 |
| Transistors 140 & 165 | 2N 5365 |
| Transistor 150 | 2N 3858A |
| Diode bridges 81, 82 & 83 | 10 DB1P (I.R.) |
| Diode 95 | 1N 914 |
| Diode 158 | A 14F (G.E.) |
| Lamp 180 | Pilot Light 28 v., 40 ma. |
| Relay, coil 154 & switch 155 | RBM-Type MS 64 |
| Voltage Source B+ | +13 v. DC (regulated) |
| Voltage Source B− | −13 v. DC (regulated) |
| Voltage Source $V_{R1}$ | +2.36 v. DC (regulated) |
| Voltage Source $V_{R2}$ | +2.43 v. DC (regulated) |
| Voltage Source $V_{R3}$ | +6.46 v. DC (regulated) |
| Voltage Source $V_{R4}$ | +2.50 v. DC (regulated) |
| Capacitor 130 | 22 mF electrolytic |
| Capacitors 120, 121, 122, 123 | 100 pf. Ceramic |
| Capacitor 93 | 40 mf. electrolytic |
| Capacitor 87 | 0.01 mf. ceramic |
| Tapped Resistor 85 | 2.0 K Pot. Clarostat 43Cl |
| Resistor 86 | 470 ohms |
| Resistors 106, 107, 108, 109 | 2.4 KΩ |
| Resistor 112 | 3,160 ohms |
| Resistor 116 | 29.4 KΩ |
| Resistors 114, 115, 117 | 976 KΩ |
| Resistors 110, 111, 113 | 2,870 ohms |
| Resistors 124 & 129 | 56 KΩ |
| Resistor 162 | 7.5 KΩ |
| Resistors 164 & 142 | 1 KΩ |
| Resistors 125 & 131 | 1.8 KΩ |
| Resistor 136 | 200 ohms |
| Resistor 128 | 226 KΩ |
| Resistor 126 | 2 meg. ohms |
| Resistor 144 | 27 ohms |
| Resistor 156 | 4.7 KΩ |

While efforts have been made to accurately record and transcribe the above set out values it is of course, possible that one or more errors may have inadvertently crept into this compilation. To guard against these, the reader is cautioned to employ the well-known methods to mathematically and experimentally verify the above.

It should now be apparent that a novel and improved overcurrent system and a new and improved combination refrigeration control and overcurrent protection system have been described that provides in a simple and effective manner a wide range of responses for differing conditions of overload current. The system is of particular advantage for use with a polyphase motor in that it responds rapidly to an overload condition in any one phase and acts to reduce the motor current before stopping the motor.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. In a refrigeration system having an electric motor-driven compressor of the type having controllable mechanical load reducing means, the improvement in a motor overcurrent protection and load regulation system of the type that develops motor current representative signals for the motor, comprising:
    at least two comparators responsive to different motor current representative signal levels one of which controls the mechanical load reducing means to reduce the mechanical load on the motor for current representative signals representing a low overcurrent situation, and the other of which produces an overload signal in response to a current representative signal representing a larger overcurrent situation;
    a time delay circuit coupled to at least said other comparator and responsive to the overcurrent signal thereof to produce a deenergizing command signal after a time delay period; and
    means coupled to said time delay circuit and responsive to the deenergizing command signal thereof for deenergizing the electric motor.

2. An automatic safety system for the protection of an electric motor by reducing the load thereon or stopping the flow of electric power thereto in response to certain sensed overloads, comprising:
    means for developing a signal that is representative of the current through the coils of the electric motor;
    means for producing a plurality of reference signals of different preselected values;
    a plurality of comparators, each coupled to said current representative signal developing means and to said reference signal producing means, for comparing the current-representative signal with a different one of the plurality of reference signals and for producing an overload signal when the current-representative signal exceeds a predetermined relationship with the one reference signal;
    a timer coupled to at least one of said plurality of comparators for responding to the overload signal thereof, so as to produce deenergizing command signal after a time delay;
    means coupled to said timer for stopping the flow of electric power to the protected electric motor in response to the deenergizing command signal thereof, and
    means for changing the mechanical load on the motor, coupled to at least another one of said plurality of comparators for at least preventing increase in the mechanical load on the motor in responsive to the overcurrent and in response to the overload signal thereof.

3. An automatic safety system for the protection of an electric motor by reducing the load thereon or stopping the flow of electric power thereto in response to certain sensed overloads, comprising:
    means for developing a signal that is representative of the current through the coils of the electric motor;
    means for producing a first, second, third and a fourth reference signal of different preselected values;
    a first comparator, coupled to said current representative signal developing means and to said reference signal producing means, for comparing the current-representative signal with the first reference signal and for producing a first overload signal when the current-representative signal exceeds a predetermined relationship with the first reference signal;
    a second comparator coupled to said current-representative signal developing means and to said reference signal producing means, for comparing the current-representative signal with the second reference signal and for producing a second overload signal when the current-representative signal exceeds a predetermined relationship with the second reference signal;
    a third comparator coupled to said current-representative signal developing means and to said reference signal producing means, for comparing the current-representative signal with the third reference signal and for producing a third overload signal when the current-representative signal exceeds a predetermined relationship with the third reference signal;
    a fourth comparator coupled to said current-representative signal developing means and to said reference signal producing means, for comparing the current-representative signal with the fourth reference signal and for producing a fourth overload signal when the current-representative signal exceeds a predetermined relationship with the fourth reference signal;
    a temperature regulator coupled to the first and second comparators which first acts to stop increasing motor current and second acts to reduce motor current in response to, respectively the first and second overload signals;
    a timer coupled to both said third and said fourth comparators for responding to one and to both of the third and the fourth overload signals thereof, so as to produce deenergizing command signal after a time delay; and
    means coupled to said timer for stopping the flow of electric power to the protected electric motor in response to the deenergizing command signal.

4. The automatic safety system for the protection of an electric motor by stopping the flow of electric power thereto in response to certain sensed overloads, as defined in claim 3 wherein;
    said system is for the protection of a motor of the polyphase type having at least two different phased AC power inputs; and
    said current-representative signal developing means produces a signal representative of the maximum current drawn by any one of the different phased AC power inputs of the motor whereby the flow of electric power to the motor may be reduced and stopped when overcurrent overloading occurs in only one phase of the power input as well as when overcurrent overloading occurs in more than one phase of the power input.

5. The automatic safety system for the protection of an electric motor by reducing the load thereon or stopping the flow of electric power thereto in response to certain sensed overloads, as defined in claim 4, wherein:
    said current-representative signal developing means develops a DC voltage signal as the current-representative signal whose amplitude varies as a function of the maximum current drawn by any one of the different phased AC power inputs of the motor;
    said reference signal producing means produces DC voltage signals as the first, second, third and fourth reference signals, which signals have different relative preselected amplitudes; and
    said first, said second, said third and said fourth comparators respectively produce their respective overload signals in response to the amplitude of the current-representative signal reaching a predetermined level in relation to, respectively, the amplitude of the first, the second, the third and the fourth reference signals.

6. The automatic safety system for the protection of an electric motor by reducing the load thereon or stopping the flow of electric power thereto in response to certain sensed overloads, as defined in claim 5, where:

said system further includes an overload indicator circuit having an input coupled to said third comparator and means for giving a sensory indication operatively controlled by the presence or absence of the third overload signal.

7. The automatic safety system for the protection of an electric motor by reducing the load thereon or stopping the flow of electric power thereto in response to certain sensed overloads, as defined in claim 6, wherein:

said sensory indication means of said indicator circuit is a lamp and said overload indicator circuit further includes a switching device operated in response to the third overload signal in circuit with said lamp and an electric power input in circuit connection with said lamp and said switching device.

8. The automatic safety system for the protection of an electric motor by reducing the load thereon or stopping the flow of electric power thereto in response to certain sensed overloads, as defined in claim 7, wherein:

said first comparator is a Schmitt Trigger circuit having a first and second input connected respectively to said current-representative signal developing means and to said reference signal producing means for respectively communicating the current-representative signal and the first reference signal thereto and an output upon which it produces the first overload signal in the form of a shift in voltage amplitude from one value to another when the amplitude of the current-representative signal reaches and surpasses the amplitude of the first representative signal;

said second comparator is a Schmitt Trigger circuit having a first and second input connected respectively to said current-representative signal developing means and to said reference signal producing means for respectively communicating the current-representative signal and the second reference signal thereto and an output upon which it produces the second overload signal in the form of a shift in voltage amplitude from one value to another when the amplitude of the current-representative signal reaches and surpasses the amplitude of the second representative signal;

said third comparator is a Schmitt Trigger circuit having a first and second input connected respectively to said current-representative signal developing means and to said reference signal producing means for respectively communicating the current-representative signal and the third reference signal thereto and an output upon which it produces the third overload signal in the form of a shift in voltage amplitude from one value to another when the amplitude of the current-representative signal reaches and surpasses the amplitude of the third representative signal;

said fourth comparator is a Schmitt Trigger circuit having a first and second input connected respectively to said current-representative signal developing means and to said reference signal producing means for respectively communicating the current-representative signal and the fourth reference signal thereto and an output upon which it produces the fourth overload signal in the form of a shift in voltage amplitude from one value to another when the amplitude of the current-representative signal reaches and surpasses the amplitude of the fourth representative signal;

9. The automatic safety system for the protection of an electric motor by reducing or stopping the flow of electric power thereto in response to certain sensed overloads, as defined in claim 8, wherein:

said first, said second, said third and said fourth comparator Schmitt Trigger circuits each include an Operational Amplifier with a first and a second primary input terminal and an output terminal which is respectively the same as the output of the Schmitt Trigger circuits;

the current-representative signal is coupled to second primary input of the Operational Amplifier of said first, said second, said third and said fourth comparators, the first, the second, the third and the fourth reference signals are coupled respectively to the second primary input terminals of the Operational Amplifier of said first, second, third and fourth comparators; and said timer comprises a resistance-capacitive circuit determined by the presence or absence of said third and said fourth overload signals.

10. The automatic safety system for the protection of an electric motor by reducing the load thereon or stopping the flow of electric power thereto in response to certain sensed overloads, as defined in claim 5, wherein:

said current-representative signal producing means includes:

at least two coils, each of which is in transformer relationship with one of the AC power input line of said motor;

means for rectifying coupled to each of said coils for developing a signal whose value is proportional to the maximum instantaneous current drawn by any one of said coils; and a peak detector circuit coupled to said rectifying means for developing as the current-representative signal a DC voltage whose level is proportional to the peak reoccurring value of the instantaneous maximum current signal.

11. In a refrigeration system of the type employing a polyphase electric motor as its prime mover and a centrifugal compressor of the type having adjustable means for mechanical load reduction, the improvement in an overcurrent protection system comprising:

current signal means for sampling the current drawn by each phase of the electric motor and for developing therefrom a current representative signal;

control means for controlling the mechanical load reduction means of the compressor, coupled to said current signal means for reducing the mechanical load of said compressor when the current representative signal exceeds a certain value;

reference signal means for generating a first, a second, a third and a fourth reference signal;

first, second, third, and fourth comparator means, each actively coupled to said current signal means and said reference signal means, for comparing the current-representative signal with, respectively, the first, second, third and fourth reference signal and for generating, respectively, a first, second, third and fourth overload signal when the current-representative signal exceeds a certain relationship with respectively the first, second, third and fourth reference signal;

load reducing means coupled to said first and second comparator for reducing the mechanical load of the motor in response to either or both of the first and second overload signals, actively coupled to said current signal means and said reference signal means, for comparing the current-representative signal with said second reference signal and for generating a second overload signal when the current-representative signal exceeds a reference signal;

timing means, actively coupled to said third and fourth comparator means, for generating a deenergizing signal in response to the continued time sustained or frequent reoccurrence of one or both of the third and fourth overload signals; and current stopping means, responsive to said timing means, for stopping the flow of electric current to the motor;

whereby said motor is protected from excessive overload conditions.

12. The improvement in a refrigeration system as defined in claim 11, of the type in which the compressor of said system is of the centrifugal type and includes prerotation vanes as the means for mechanical load reduction, which is further particularized by having:

said current signal means includes a plurality of current transformers, each of which is coupled to one phase of the electric motor, and a rectifying circuit connected to said plurality of transformers for developing a DC signal proportional to the maximum current present in any phase;

said prerotation vanes are operated during no overload signal situations in accordance with sensed temperature functions, which functioning is overridden when an overload signal is received;

said reference signal source is a voltage divider circuit;

said first comparator means, said second comparator means, said third comparator means and said fourth comparator means are each made up of an Operational Amplifier circuit connected to form a Schmitt Trigger comparator circuit;

said timing means includes a capacitor, a resistive charging path for said capacitor whose effective resistance is controlled by the third and fourth comparator means, and a command signal triggering device coupled to the said capacitor to activate the deenergizing signal when the voltage level across said capacitor reaches a predetermined triggering level; and said current stopping means includes a thyristor device responsive to the deenergizing signal to interrupt the current to the electric motor.

13. The automatic safety system for the protection of an electric motor by reducing the load thereon or stopping the flow of electric power thereto in response to certain sensed overloads as defined in claim 2, wherein:

said plurality of comparators 52, 54, 56 and 58 are each solid state circuits having substantially matching characteristics, with one another;

a single calibration control 40 is provided for adjusting the relative value between the current representative signal and the plurality of reference signals, whereby said safety system may be calibrated during setup and afterward, by a single step operation of adjusting the calibration control to set the magnitude of overcurrent at which each of the comparators will produce an overcurrent signal and also to thereby adjust the sensitivity of the system.

14. The automatic safety system for the protection of an electric motor by reducing the load thereon or stopping the flow of electric power thereto in response to certain sensed overloads, as defined in claim 6, wherein:

said sensory indication means of said indicator circuit is a light emitter and said overload indicator circuit further includes a switching device operated in response to the third overload signal in circuit with said light emitter and an electric power input in circuit connection with said light emitter and said switching device.

\* \* \* \* \*